United States Patent
Hamid et al.

(10) Patent No.: US 8,924,309 B2
(45) Date of Patent: *Dec. 30, 2014

(54) METHOD OF PROVIDING ASSURED TRANSACTIONS BY WATERMARKED FILE DISPLAY VERIFICATION

(75) Inventors: Laurence Hamid, Ottawa (CA); Darren Krahn, Kanata (CA)

(73) Assignee: Imation Corp., Oakdale, MN (US)

( * ) Notice: Subject to any disclaimer, the term of this patent is extended or adjusted under 35 U.S.C. 154(b) by 524 days.

This patent is subject to a terminal disclaimer.

(21) Appl. No.: 12/186,734

(22) Filed: Aug. 6, 2008

(65) Prior Publication Data

US 2009/0049301 A1 Feb. 19, 2009

Related U.S. Application Data

(60) Provisional application No. 60/935,347, filed on Aug. 8, 2007.

(51) Int. Cl.
- *G06Q 20/00* (2012.01)
- *G06Q 20/40* (2012.01)
- *G06Q 30/06* (2012.01)
- *H04L 29/06* (2006.01)

(52) U.S. Cl.
CPC .............. *G06Q 20/401* (2013.01); *G06Q 20/40* (2013.01); *G06Q 30/06* (2013.01); *H04L 63/0823* (2013.01); *H04L 63/12* (2013.01); *H04L 63/0861* (2013.01)
USPC ............. 705/75; 705/64; 705/26.35; 713/176

(58) Field of Classification Search
USPC ....................................... 705/64, 75; 713/176
See application file for complete search history.

(56) References Cited

U.S. PATENT DOCUMENTS

| | | | |
|---|---|---|---|
| 5,778,071 A | 7/1998 | Caputo et al. | |
| 5,917,913 A | 6/1999 | Wang | |
| 5,956,404 A * | 9/1999 | Schneier et al. | 713/180 |
| 6,003,135 A | 12/1999 | Bialick et al. | |
| 6,018,724 A | 1/2000 | Arent | |

(Continued)

FOREIGN PATENT DOCUMENTS

| | | |
|---|---|---|
| EP | 1 055 989 A1 | 11/2000 |
| EP | 1 433 614 A1 | 6/2004 |

(Continued)

OTHER PUBLICATIONS

ISR/CA, "International Search Report", dated Nov. 18, 2008, pp. 1 to 4.

(Continued)

*Primary Examiner* — Steven Kim
(74) *Attorney, Agent, or Firm* — Dorsey & Whitney LLP (57) ABSTRACT

Electronic transactions employing prior art approaches of digital certificates and authentification are subject to attacks resulting in fraudulent transactions and abuse of identity information. Disclosed is a method of improving electronic security by establishing a secure trusted path between a user and an institution seeking an electronic signature to verify a transaction before any request for signature and completing electronic transaction activities occurs. The secure trusted path providing the user with a predetermined portion of the request from the institution for a signature upon a personalized device that cannot be intercepted or manipulated by malware to verify that the request as displayed upon the user's primary computing device is valid.

16 Claims, 4 Drawing Sheets

(56) References Cited

U.S. PATENT DOCUMENTS

| | | | |
|---|---|---|---|
| 6,425,081 B1* | 7/2002 | Iwamura | 713/176 |
| 6,757,827 B1* | 6/2004 | Geist | 713/176 |
| 6,952,497 B1 | 10/2005 | Hollstrom et al. | |
| 6,983,057 B1 | 1/2006 | Ho et al. | |
| 7,042,470 B2* | 5/2006 | Rhoads et al. | 345/634 |
| 7,069,451 B1 | 6/2006 | Ginter et al. | |
| 7,113,615 B2 | 9/2006 | Rhoads et al. | |
| 7,162,637 B2* | 1/2007 | Wakao et al. | 713/176 |
| 7,216,237 B2 | 5/2007 | Vanstone | |
| 7,275,160 B2* | 9/2007 | Pearson et al. | 713/172 |
| 7,308,577 B2* | 12/2007 | Wakao | 713/176 |
| 7,403,641 B2* | 7/2008 | Nakamoto et al. | 382/118 |
| 7,506,163 B2* | 3/2009 | Mansz et al. | 713/168 |
| 7,552,333 B2 | 6/2009 | Wheeler et al. | |
| 7,555,655 B2* | 6/2009 | Smith et al. | 713/185 |
| 7,568,111 B2* | 7/2009 | Alve et al. | 713/189 |
| 7,706,565 B2 | 4/2010 | Levy et al. | |
| 7,757,089 B2 | 7/2010 | Kusuda et al. | |
| 7,930,548 B2* | 4/2011 | Wakao | 713/176 |
| 2001/0056410 A1 | 12/2001 | Ishigaki | |
| 2002/0073042 A1 | 6/2002 | Maritzen et al. | |
| 2002/0143649 A1* | 10/2002 | Wise | 705/26 |
| 2003/0231785 A1 | 12/2003 | Rhoads et al. | |
| 2004/0022444 A1* | 2/2004 | Rhoads | 382/232 |
| 2004/0099740 A1* | 5/2004 | Chresand et al. | 235/457 |
| 2005/0078851 A1 | 4/2005 | Jones et al. | |
| 2005/0144063 A1 | 6/2005 | Spector | |
| 2006/0080538 A1 | 4/2006 | Kusuda et al. | |
| 2006/0135206 A1 | 6/2006 | Louks et al. | |
| 2006/0179304 A1 | 8/2006 | Han | |
| 2006/0282676 A1 | 12/2006 | Serret-Avila et al. | |
| 2006/0287963 A1 | 12/2006 | Steeves et al. | |
| 2007/0053513 A1 | 3/2007 | Hoffberg | |
| 2007/0130618 A1 | 6/2007 | Chen | |
| 2008/0061137 A1* | 3/2008 | Dutta et al. | 235/380 |
| 2008/0082821 A1 | 4/2008 | Pritikin | |
| 2008/0098464 A1* | 4/2008 | Mizrah | 726/5 |
| 2008/0127319 A1 | 5/2008 | Galloway et al. | |
| 2008/0133415 A1 | 6/2008 | Ginter et al. | |
| 2008/0141365 A1* | 6/2008 | Soegtrop | 726/21 |
| 2008/0175377 A1* | 7/2008 | Merrill | 380/30 |
| 2008/0229109 A1* | 9/2008 | Gantman et al. | 713/176 |
| 2009/0106556 A1 | 4/2009 | Hamid | |
| 2009/0235081 A1* | 9/2009 | Hamid et al. | 713/176 |
| 2009/0307133 A1* | 12/2009 | Holloway et al. | 705/44 |
| 2012/0060036 A1 | 3/2012 | Hamid et al. | |

FOREIGN PATENT DOCUMENTS

| | | |
|---|---|---|
| JP | 2002-358471 A | 12/2002 |
| WO | WO 03-048939 A1 | 6/2003 |
| WO | WO 2006/091368 | 8/2006 |

OTHER PUBLICATIONS

Soriente et al. "HAPADEP: Human-Assisted Pure Audio Device Pairing", Computer Science Department, University of California Irvine, 2008, 16 pages.

* cited by examiner

METHOD OF PROVIDING ASSURED TRANSACTIONS BY WATERMARKED FILE DISPLAY VERIFICATION

FIELD OF THE INVENTION

The invention relates to providing assured transactions and more particularly to establishing trusted communication paths between correspondents and verification of displayed watermarks.

BACKGROUND OF THE INVENTION

In recent years electronic commerce (e-commerce) has been the focus of significant attention as Internet-related sales grew at rates of 25 percent or more. Despite this in 2006 overall online sales within the US excluding travel purchases, represented only approximately 6 percent of US retail sales. In 2007 including travel this figure was expected to increase 18 percent to approximately US$260 billion.

Hampering e-commerce, and therefore it's growth, is the prevalent view that e-commerce has many privacy and security issues, of which a central aspect is that there is no reliable way to ensure that the sender of an electronic transmission is in fact who they purport to be. The non-physical nature of the Internet leads to distrust because the consumer does not interact with a live person, the consumer does not see actual products, and most significantly, the user provides payment information to this unseen and unknown vendor.

In face-to-face commerce, the client and the merchant provide identification, authentication and authorization. Identification is the process that enables recognition of a customer or vendor, for example a store with signage, authentication is the act of verifying the claimed identity of an individual, for example by viewing a second piece of identification, and authorization is the final step wherein a transaction is completed, for example, by providing a credit card and signing the resulting credit slip. Further, since the customer is standing in front of the vendor, it is typically straightforward to ensure privacy, prevent identity theft, etc.

Solutions for use across the Internet for providing identification, authentication, and authorization have focused heavily on the applications of cryptography. Using cryptography allows a secure connection between two endpoints to ensure that communications are not intercepted and tampered with. Other aspects of the commercial transaction have remained substantially the same—a product or service is selected, an invoice is prepared for the product or service, a payment method is provided and an authorization is received. Once completed, the transaction is sometimes confirmed through an alternative communication path, for example by email.

A more technical security attack is a "man-in-the-middle" security attack. In such an attack, a system intercepts messages from each end of a communication path, placing the system in the middle of the communication. The system sets up secure communication paths which each end of the path and has access to the communication in the middle. As such, the man-in-the-middle can eavesdrop, record, or alter the data. Most problematically, a man-in-the-middle is typically a software process and, as such, could be executing on the user's own system.

When a man-in-the-middle security attack is employed, message integrity verification is important to ensure that no tampering has occurred. Message integrity checking is typically determined using codes that digest or hash the original message data, such as message digest codes.

Non-repudiation describes the creation of cryptographic receipts so that an author of a message cannot falsely deny sending a message. Thus the Internet reveals the full complexity of trust relationships among people, computers, and organizations.

Cryptographic processes involving the private key such as digital signatures and key exchanges are known to be performed on, for example, a peripheral card. By signing transactions in such an environment, users are assured a modicum of integrity and privacy of the data exchanged between themselves and the other party in the transaction. The private key need not be revealed outside of the peripheral card. However, one of the disadvantages of peripheral cards is that the owner is not protected from abuse of the host system. For example, because of the lack of a user interface, such as a display screen, the owner may not be sure about the contents of the actual message being signed.

Another approach adopted has been to implement the solutions by means of a personalized device, such as a wireless application protocol (WAP) capable mobile phone or wireless personal digital assistant (PDA), the personalized devices then providing the signing token. Such a personalized device can store private keys and sign transactions on behalf of its owner. In such a situation, the holder of the personalized device is assumed to be its rightful owner or authorized representative as determined by an appropriate access-control mechanism, though this may not be the case. This approach is extended further by Vanstone in U.S. Pat. No. 7,216,237 entitled "System and Method for Trusted Communication" where a data message is generated on an external device, such as a personal computer (PC), and then presented to the personalized device for signing.

Vanstone teaching that the client may compare the message on the PC and personalized device prior to issuing the approval to append their electronic signature to the message and thereby complete, for example, the e-commerce transaction. Alternatively Vanstone teaches that all activities are contained within the personalized device, enabling wireless e-commerce transactions.

However, there exists substantial risk for fraud in either approach. In the first approach when the message is prepared on a PC and conveyed to the personalized device the integrity of the message is questionable and the ability to verify the message adequately is also in question. Thus, though the signed data message is transmitted via the personalized device, it is difficult to use the small viewing area and typically inconvenient user interface of the personalized device to verify the entire document.

In the second situation, wherein all activities are contained within the personalized device then one faces the inconveniences of verifying and performing transactions with the limitations of a personalized device.

It would be advantageous to provide a method and system that overcomes at least some of the above-noted limitations.

SUMMARY OF THE INVENTION

In accordance with an aspect of the invention there is provided a computer server comprising: a memory store for storing a plurality of watermarks; a suitably programmed processor for receiving transaction data, for selecting a first watermark from the plurality of watermarks, for producing first verification data comprising first data for verification and relating to the transaction and first watermark data relating to the first watermark for preventing tampering with the first data, and for providing second verification data comprising an indication of the selected watermark; and, at least a transmitter for transmitting the first verification data to a destination system and for transmitting the second verification data to a second other destination system.

In accordance with another aspect of the invention there is provided a secure processing system comprising: a memory having stored therein indications for watermarks of a plurality of known watermarks; a processor for receiving second verification data and for determining based thereon an indication of a watermark; and, a display for displaying the indication to a user of the secure processing system.

In accordance with another aspect of the invention there is provided a method comprising: establishing a first communication path between a first system and a server; receiving from the first system data relating to a transaction for a known user; providing to the first system first verification data for verifying and authorizing the transaction, the first verification data comprising a watermark; establishing a second communication path between a second other system and the server, the second system associated with the known user; and, providing to the second other system second verification data for use in providing an indication of the watermark.

In accordance with yet another aspect of the invention there is provided a computer readable medium having stored therein data according to a predetermined computing device format for when executed resulting in: establishing a first communication path between a first system and a server; receiving from the first system data relating to a transaction for a known user; providing to the first system first verification data for verifying and authorizing the transaction, the first verification data comprising a watermark; establishing a second communication path between a second other system and the server, the second system associated with the known user; and, providing to the second other system second verification data for use in providing an indication of the watermark.

In at least an embodiment, the system comprises a digital signature processor for digitally signing a document.

In at least an embodiment, the second verification data comprises an index indicative of the watermark, wherein the watermark is selected from a plurality of predetermined watermarks.

In at least an embodiment, the first verification data comprises a time signature, the time signature for use in detecting delays, the delays potentially indicative of tampering.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

In the description and claims that follow the term watermark is used to denote data unrelated to a specific transaction that is inserted within transaction verification data in a manner that it is not easily separable from the transaction verification data. An example of a watermark is a light background image on a document onto which transaction details are superimposed such that changing of transaction details results in erasing of some of the watermark and is therefore detectable. Another example of a watermark is an audio stream superimposed on an audio transaction verification data. An example of such a watermark is a song in low volume playing in the background as transaction details are played in audio form such that changing of the audio content of the transaction details is detectable because the background song is silent or changed.

Figure 1:
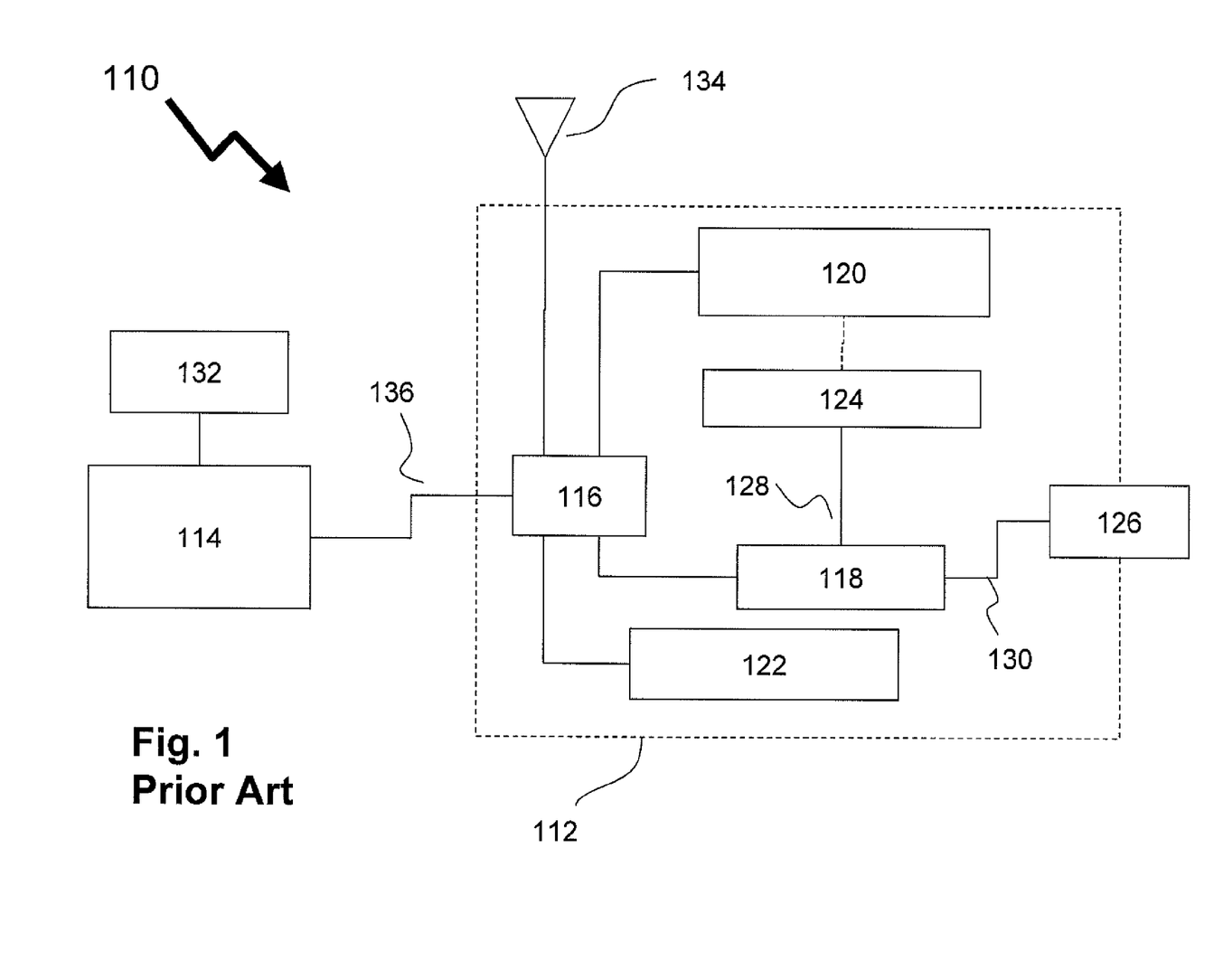
FIG. 1 illustrates a prior art approach to providing a trusted message for signature by a client according to U.S. Pat. No. 7,216,237 in the name of Vanstone.

FIG. 1 illustrates a prior art approach to providing a trusted message for signature by a client according to U.S. Pat. No. 7,216,237 in the name of Vanstone where a system 110 for verifying the integrity of a data message is presented between a first device and a second device that are in communication with each other. The first device is designated as a personalized device 112 and the second device is designated as a personal computer 114. In this embodiment according to Vanstone the personalized device 112 is a mobile phone controlled by a main processor 116 including a secure module 118. The secure module 118 is adapted to operate independently of the main processor 116, so that an internal state of the secure module 118 cannot be readily reverse engineered and or that its interactions with the underlying hardware are not maliciously intercepted and reinterpreted. Coupled to the device main processor 116 is a device display 120, for providing textual and graphical displays that prompt a user for input information. A keyboard 122 coupled to the device main processor 116 facilitates the provision of information. Similarly, the secure module 118 is in communication with a secure display 124, and a trusted button 126.

The secure display 124 is wholly under the control of the secure module 118 and coupled thereto by secure path 128, and the trusted button 126 is in direct communication with the secure module 118 via secure path 130. Thus, the secure paths 128 and 130 are logically isolated and distinct from any other paths. The secure module 118, the secure I/O devices 124 and 126, and the secure paths 128 and 130 form trusted paths between said secure module 118 and a user of the personalized device 112. The personal computer 114 includes an external display 132. The data message for authentication is transmitted from the external computer 114 via a communication path 136 to the personalized device 112 and is then received by the message transceiver 134. The data message for authentication by the personalized device 112 is communicated from the personal computer 114 via communication path 136 or through a wireless interface via antenna 134. Thus, the personalized device 112 receives data, and is used to sign a data message generated on the personal computer 114. In operation, the personal computer 114 assembles the data comprising the portion of the data message to be signed, preferably displaying the appropriate data message on the external display 132, and conveys the data to the personalized device 112 via the path 136.

The main processor 116 conveys the data to the secure module 118, optionally displaying the same data on the display 120. The secure module 118 displays the data message, or a portion of the message, on the secure display 124 in an appropriate format. In order to verify the integrity of the data, the user compares the data message on the external display 132, with the data message on the secure display 124. If there is a correlation between the two data messages, the user instructs a signature generator process to generate a signature by actuating the trusted actuator in the form of trusted button 126.

In the system 110 presented by Vanstone the trusted path is established only between the personal computer 114 and personalized device 112, both of which belong to the same user. As such the trusted path is used solely for the portion of the data message to be signed. As such Vanstone does not protect the user from MITM attacks on the personal computer 114 that adjust the contents of the data message such that the user is not necessarily aware of the content of the full message they are signing. Further, the user does not know where to look for tampering and, as such, must review the document displayed on the personal device very carefully. This is both inconvenient and difficult since most mobile phones have very small displays and many documents requiring signing are lengthy and detailed.

Figure 2:
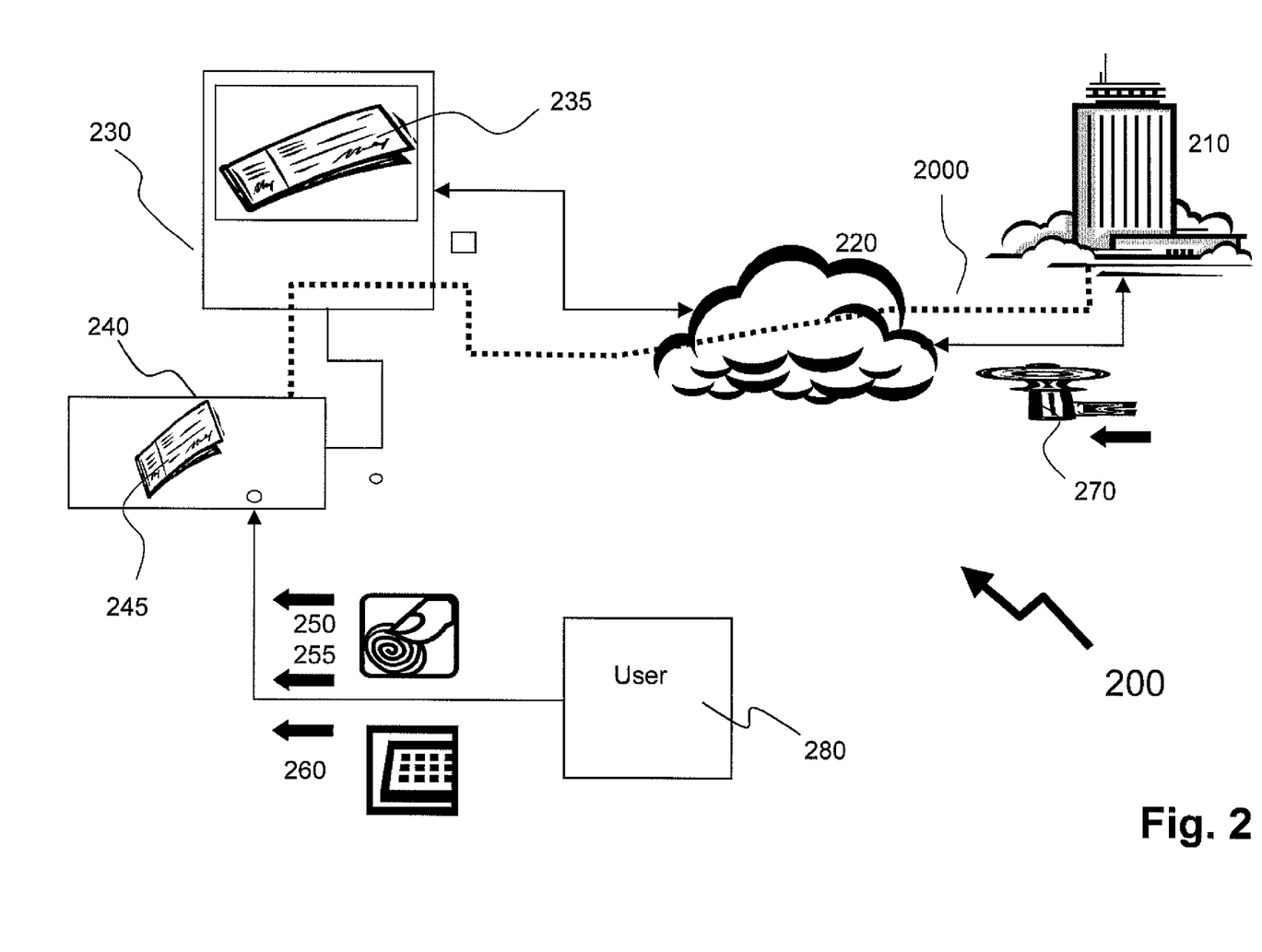
FIG. 2 illustrates a first exemplary embodiment of the invention wherein a trusted path is initially established between the transacting party and the client through the use of a secure demountable memory device.

An exemplary embodiment of a trusted path 2000 from transactor 210 to user 280 is shown in FIG. 2 with reference to the transaction system 200 according to an embodiment of the invention. As such user 280 wishing to perform at least one transaction with the transactor 210 initiates the establishment of a secure communications channel by connecting their security module 240 to their laptop computer 230, and initiating a request to the transactor 210. Both the transactor 210 and laptop computer 230 are interconnected via a network in the form of the World Wide Web (commonly referred to as Internet) 220. Upon receiving the request from the user 280 the transactor 210 issues a certificate 270 to the user 280, which is communicated via the Internet 220 to the laptop computer 230 and thereupon to the user's security module 240.

The certificate 270 is a digital document issued by the transactor 210 attesting to the binding of a public key to the transactor 210, and allowing verification of the claim that the public key provided with the certificate 270 does in fact belong to the transactor 210. The certificate thereby prevents a third party from using a fraudulent public key to impersonate the transactor 210. In its simplest form certificate 270 contains a public key and a name, although commonly it also contains an expiration date, the name of the certifying authority that issued the certificate, a serial number, and perhaps other information. Most importantly, it contains a digital signature of the certificate issuer. The most widely accepted format for certificates is defined by the ITU-T X.509 international standard, although other formats may be employed without departing from the scope of the invention.

The security module 240 upon validating the certificate 270 requests that user 280 provide verification of their identity. As shown the security module 240 requires the user 280 to provide both a fingerprint 250 and a password 260, the fingerprint 250 verifies the physical presence of the user 280 at the security module 240, and the password 260 provides access to their transaction file with the transactor 210. Upon validating both the fingerprint 250 and password 260 the security module 240 provides the transactor 210 with any key or password information necessary to complete the establishment of a trusted path 2000 between user's security module 240, and therein user 280, and transactor 210. The user 280 now has access to transactions they wish to undertake upon their laptop computer 230, wherein prior to completing a transaction the user 280 is requested to authorize their digital signature to complete the transaction.

When a transaction is requested and information for the transaction is provided, a validation request is generated in the form of a visual indication of the content of the transaction. At this point the first validation request 235 is displayed on a display in the form of a display on the user's laptop computer 230 and on a second display in the form of a display on the user's security module 240 as second validation request 245. The user 280 if determining that the first and second validation requests 235 and 245 are correct and correlated initiates issuance of their digital signature by providing authorization in the form of second fingerprint 255.

According to the first exemplary embodiment of the invention a trusted path 2000 is initially established between transactor 210 and the user's security module 240, optionally relying on user input data in the form of fingerprint 260 and password 250.

Subsequently, any transactions provide for information presented to the user on their primary system of initiating the transaction, in the form of laptop computer 230 to be in accordance with information provided by the transactor 210 to the user's security module 240. Examples of such information including but not limited to a second digital certificate, a digital watermark, a coded image, and an item of information known only by both parties and an indication of pertinent details within a document for signature.

For digital watermarking, for example, a document provided to the primary system is watermarked and an indication of said watermark is provided to the user via the security module 240. A digital watermark comprises an embedded watermark within the transaction document that is integral to the document such that changing information within the document is noticeable due to changes in the watermark. Verification of the watermark performed based upon information provided via the trusted path 2000. For example, an image of the watermark is provided via the trusted path 2000 to the user's security module 240.

Alternatively, the information provided on the user's security module 240 is an indication of the information provided by the transactor and displayed to the user, such as on their laptop computer 230. For example, the information provided on the user's security module 240 comprises "George Washington", indicating that the information provided by the transactor should include a watermark of George Washington to be valid. In another example, the information comprises "Trisha's Date of Birth" indicating that the watermark is the date of birth of Trisha, a family member, friend or other person whose date of birth is known to the user. Such approaches making use of a false digital signature for fraudulent transactions more difficult and avoidable as every transaction can be verified using a different one of a plurality of allowed watermarks. Optionally, the watermarks are selected from a group of general watermarks. Alternatively, the watermarks include watermarks that are specific to the user.

Though the above described embodiment includes a secure path to the module, a same method is implementable without the secure path either using secret information for determining a watermark or relying on the different transmission paths of the packets to provide some level of security.

Figure 3:
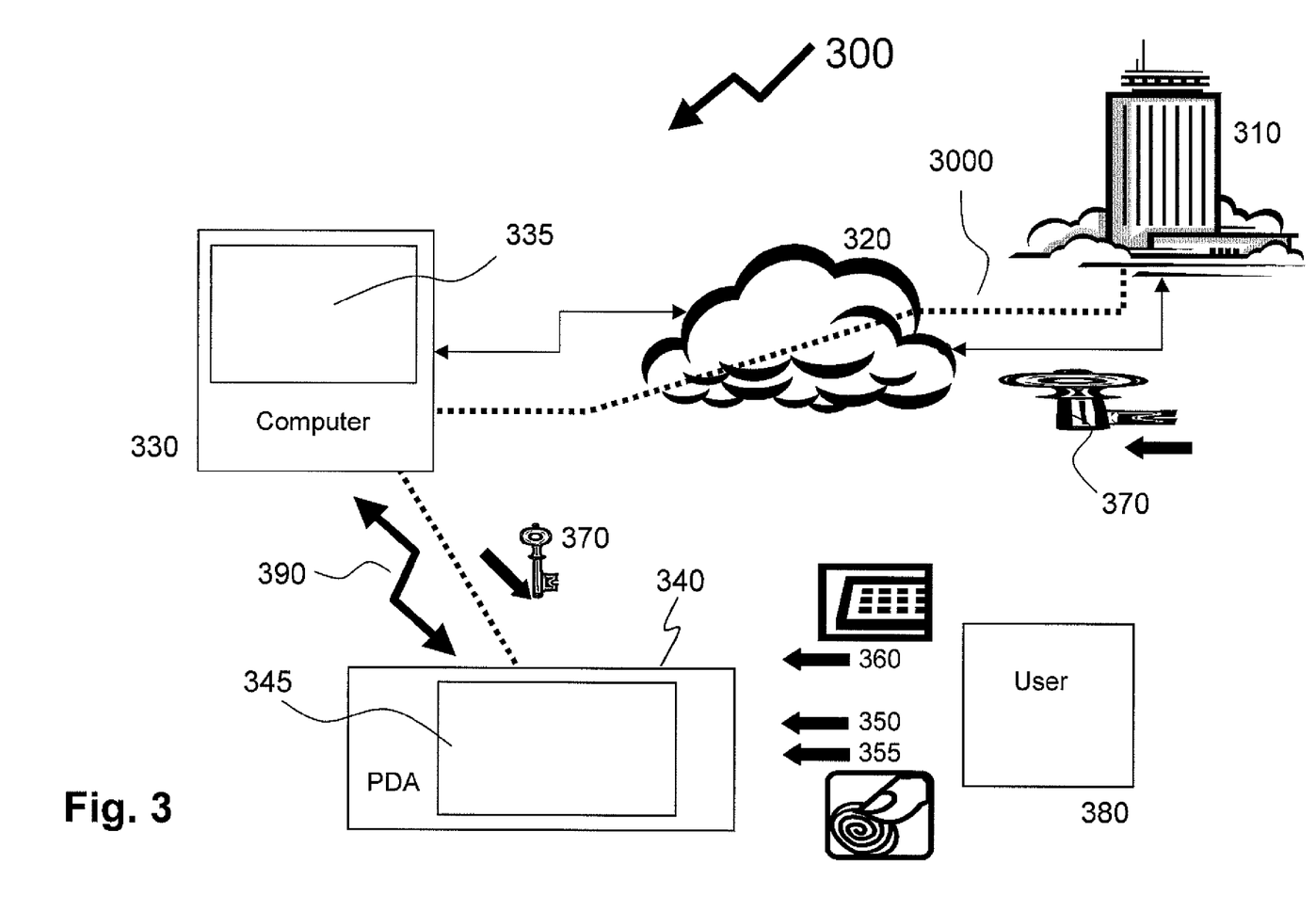
FIG. 3 illustrates a second exemplary embodiment of the invention where the trusted path is established with a personal electronic device of the client in peer-to-peer communications with the clients PC, and the transaction primarily initiated upon the clients PC.

An exemplary second embodiment of the invention is presented in respect of a trusted path 3000 from transactor 310 to user 380 with reference to the transaction system 300 as shown in FIG. 3. As such the user 380 wishing to perform at least one transaction with a transactor 310 initiates establishment of a secure communications channel by coupling security module 340 in the form of a personal digital assistant (PDA) with laptop computer 330 via a peer-to-peer (P2P) link 390, and initiating a request to the transactor 310. Both the transactor 310 and laptop computer 330 are interconnected via a network in the form of the Internet 320. Optionally, the security module 340 is in communication with the transactor via its own connection to the Internet 320 rather than via the laptop computer 330 by the P2P link 390. Upon receiving the request from the user 380 the transactor 310 issues security data in the form of a certificate 370 to the user 380, which is communicated via the Internet 320 to the laptop computer 330 and thereupon via P2P link 390 to the security module 340.

The certificate 370 comprises a digital document issued by the transactor 310 attesting to the binding of a public key to the transactor 310, and allowing verification of the claim that the public key provided with the certificate 370 does in fact belong to the transactor 310. The certificate thereby restricts a third party from using a fraudulent public key to impersonate the transactor 310.

The PDA 340 upon validating the certificate 370 requests that user 380 provides verification of their identity. As shown, the security module 340 prompts the user 380 to provide both a first fingerprint 350 and a password 360, the first fingerprint 350 verifying the physical presence of the user 380 at the security module 340, and the password 360 providing access to their transaction file with the transactor 310. Optionally, other forms of user authentication are employed. Upon validating both the first fingerprint 350 and password 360 the security module 340 provides the transactor 310 with any key or password information necessary to complete the establishment of a trusted path 3000 between user's security module 340 and transactor 310. The user 380 enters data relating to transactions to undertake using laptop computer 330. Once a transaction is determined and prior to completing the transaction, the user 380 is requested to provide their digital signature to complete the transaction. At this point the first validation request 335 including transaction related data is displayed on the user's laptop computer 330 and the second validation request including verification data is provided at the user's security module 340. The user 380 verifies the first validation request 335 against an indication 345 determined based on the second validation request and when correlated initiates issuance of their digital signature, for example by providing second fingerprint 355.

Examples of the first validation request 335 include but are not limited to embedding a message with steganography, a digital watermark, a further digital certificate, a text seal, an image seal, and a Turing test. Examples of Turing tests include completely automated public Turing test to tell computers and humans apart (CAPTCHA), recursive Turing tests (RTTs) and automated Turing tests (ATTs). Further, as discussed supra in respect of FIG. 2 the information provided on the user's security module 340 is optionally an indication of the information provided by the transactor and displayed on laptop computer 330. Accordingly, in this manner the security module 340 does not require the same display capabilities as the laptop computer 330. For example, the information provided on the user's security module 340 is optionally "George Washington", indicating that the information provided by the transactor should include a watermark of George Washington to be valid; this is accomplishable via a small LCD character display, via a speaker, or via a set of LEDs each with an associated watermark. As such the security module is manufacturable at low cost with increased simplicity, or may be embedded into a variety of low cost electronic devices, such as USB tokens, USB memory sticks, MP3 players etc.

Such approaches render false generation of potential transactions by, for example, a man-in-the-middle more difficult as every transaction includes verification data. In an embodiment, the verification data comprises one or more of a plurality of watermarks. Further the watermarks are optionally unique to a person or organization. Alternatively, the watermarks are generic to the system. Further, the watermark information is optionally periodically revised and communicated to the user's security module during other activities, not necessarily associated with a transaction, or communicated through a physical coupling when the user is at work, for example. Of course, providing a visual display presenting the watermark provides significant flexibility since each document is watermarkable with a different unique image.

Optionally, the second exemplary embodiment is implemented without relying on secure communications. For example, when a watermark is used, it is possible to encode within the first verification data the watermark and then to transmit to the PDA 340 an indication of the watermark content all without security. Modifying of the first verification data 345 is detectable through careful review of the watermark and it is unlikely that a man-in-the-middle will successfully intercept the first verification data 345 and second verification data. Optionally, a code is transferred to the PDA 340 where it is converted to an intelligible indication of the watermark content. For example, an address for a look-up table is provided and the PDA 340 looks up the watermark descriptor. In such an embodiment, the watermark descriptors are optionally changed at intervals, and, as such, it is difficult even when the codes are intercepted to know what they mean.

Optionally, instead of the PDA 340, a peripheral memory storage device such as a USB memory stick is employed. Further optionally, another device is used that provides suitable functionality for carrying out the invention.

Figure 4:
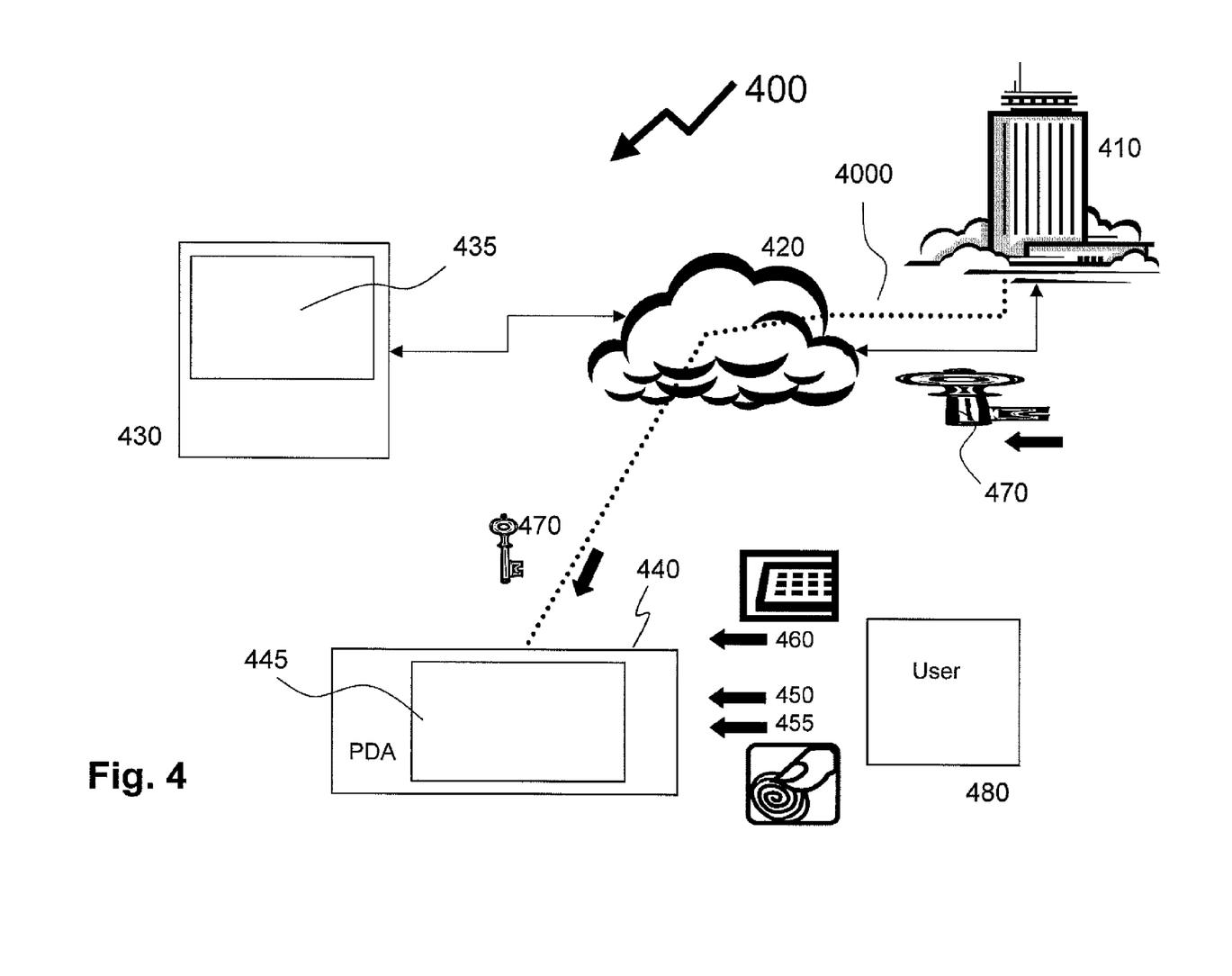
FIG. 4 illustrates a third exemplary embodiment of the invention where the trusted path is established with a personal electronic device of the client, the transaction primarily initiated upon the clients PC, and the trusted path and transaction paths are completely separate.

An exemplary third embodiment of the invention is presented in respect of a trusted path 4000 from transactor 410 to user 480 with reference to the transaction system 400 as shown in FIG. 4. The user 480 wishing to perform at least one transaction with a transactor 410 initiates establishment of a secure communications channel by using a secure communication device in the form of personal digital assistant (PDA) 440 to initiate a request to the transactor 410. Both the transactor 410 and PDA 440 are interconnected via a network in the form of the Internet 420. Upon receiving the request from the user 480 the transactor 410 issues a certificate 470 to the user 480, which is communicated via the Internet 420 directly to their PDA 440.

The certificate 470 comprises a digital document issued by the transactor 410 attesting to the binding of a public key to the transactor 410, and allowing verification of the claim that the public key provided with the certificate 470 does in fact belong to the transactor 410. The certificate thereby prevents a third party from using a fraudulent public key to impersonate the transactor 410. Alternatively, other methods of establishing a secure communication path are employed.

The PDA 440 upon validating the certificate 470 requests that user 480 provides verification of their identity. As shown, the PDA 440 prompts the user 480 to provide both a first fingerprint 450 and a password 460, the first fingerprint 450 verifying the physical presence of the user 380 at the PDA 440, and the password 460 providing access to their transaction file with the transactor 410. Upon validating both the first fingerprint 450 and password 460 the PDA 440 provides the transactor 410 with any key or password information to complete the establishment of a trusted path 4000 between user's PDA 440, and therein user 480, and transactor 410. Optionally, other methods of user verification are employed. Further optionally, user verification is not performed. The user 480 provides data relating to transactions to be undertaken with the transactor 410 upon laptop computer 430. A transaction is determined and prior to implementing the transaction the user 480 provides a digital signature. In requesting the digital signature a first validation data 435 is provided and displayed on the laptop computer 430 and a second validation data is provided and in dependence thereon verification information 445 is displayed to the user at the PDA 440. The user 480 verifies the first validation data 435 against the verification information and when satisfied initiates issuance of the digital signature, for example by providing a personal identification number. Preferably, the digital signature and digital signing occurs on the PDA 440.

It would be apparent that in this embodiment the paths between the laptop computer 430 and PDA 440 are different for portions of their paths, and potentially do not overlap except very close to the transactor 410. For example, the laptop computer 430 is optionally physically connected to the Internet 420 via a local area network or cable Internet service, or wirelessly interconnected to a local access point for the Internet 420 according to a standard such as WiFi or WiMax operating at 2.40 Hz or 5 GHz typically. In contrast PDA 440 is optionally connected to the Internet 420 via a wireless link to a cellular base station, according to a standard such as Global System for Mobile (GSM) operating at 850 MHz, 900 MHz, 1800 MHz, or 1900 MHz. The cellular base station is connected to a cellular backbone network, such as optical fiber local area network, to a routing hub of the wireless providers network. From this routing hub the connection to the transactor 410 is via the Internet.

Optionally, the issuance of the digital signature in respect of a transaction is performed by the transmission of a verification message from the PDA 440 to the transactor 410 via the trusted path 4000, or by a peer-to-peer transfer from the PDA 440 to the laptop computer 430. Accordingly the third exemplary embodiment provides route diversification for the first and second validation data 435 from the transactor 410 to the user 480. Such route diversification renders interception of both the first validation data 435 and the second validation data by a same party for a MITM attack significantly more difficult. Further, the presence of malware on the laptop computer 430 does not affect the second validation data 445 as this is other than communicated via the laptop computer 430.

Optionally, the second exemplary embodiment is implemented without relying on secure communications. For example, when a watermark is used, it is possible to encode within the first verification data 435 the watermark and then to transmit to the PDA 440 second verification data for determining therefrom an indication of the watermark content 445 all without security. Modifying of the first verification data 435 is detectable through careful review of the watermark and it is unlikely that a man-in-the-middle will successfully intercept the first and second verification data 435 and 445.

Optionally, second verification data in the form of a code is transferred to the PDA 440 where it is converted to an intelligible indication of the watermark content 445. For example, an address for a look-up table is provided and the PDA 440 looks up the watermark descriptor. In such an embodiment, the watermark descriptors are optionally changed at intervals, and, as such, it is difficult even when the codes are intercepted to know what they mean.

Optionally, instead of the PDA 440, a peripheral memory storage device such as a USB memory stick is employed. Further optionally, another device is used that provides suitable functionality for carrying out the invention.

Although the above embodiments are described with reference to a laptop computer, another suitable processor based system is optionally used in its place.

Numerous other embodiments may be envisaged without departing from the spirit or scope of the invention.

What is claimed is:

1. A computer server system for providing assured transactions, the system comprising:
   a server device comprising:
      a memory store storing a plurality of watermarks, the watermarks being unrelated to any specific transaction; and
      one or more processors;
   one or more non-transitory computer readable media storing computer executable instructions which, when executed by the one or more processors, cause the one or more processors to perform operations comprising:
      establishing, by the server device, a first communication path between a first user device and the server device via a network,
      receiving, by the server device, from the first user device via the network transaction data relating to a transaction for a known user,
      selecting, by the server device, a watermark from the memory store storing the plurality of watermarks, wherein the watermarks are unrelated to any specific transaction,
      including, by the server device, the selected watermark in first verification data comprising first data for verification and relating to the transaction and watermark data relating to the watermark for preventing tampering with the first data,
      transmitting, by the server device, to the first user device the first verification data via the first communication path,
      establishing, by the server device, a second communication path between a second user device and the server device via a network, the second user device associated with the known user, and
      transmitting, by the server device, to the second user device second verification data providing an indication of the selected watermark via the second communication path, wherein the second verification data comprises an index,
   wherein a processor of the second user device is configured for:
      retrieving indication data of the selected watermark from a memory storing a plurality of indication data of watermarks based on the index, and
      providing to the user the indication data; and
      receiving, by the server device, transaction verification data from the first user device; and
   a transmitter configured for transmitting the first verification data to the first user device and for transmitting the second verification data to the second user device.

2. A computer server system according to claim 1 comprising:
   a first interface for coupling with a peripheral memory storage device having stored therein descriptions of at least some of the plurality of watermarks, the descriptions stored in association with indications each description for being retrieved in response to a different indication.

3. A method comprising:
   establishing, by a server, a first communication path between a first system and the server via a network;

receiving, by the server, from the first system via the network data relating to a transaction for a known user;
selecting, by the server, a watermark from a memory storing plurality of watermarks, wherein the watermarks are unrelated to any specific transaction;
including, by the server, the selected watermark in first verification data;
transmitting, by the server, to the first system the first verification data via the first communication path;
establishing, by the server, a second communication path between a second system and the server via a network, the second system associated with the known user; and
transmitting, by the server, to the second system second verification data providing an indication of the selected watermark via the second communication path, wherein the second verification data comprises an index;
wherein a processor of the second system is configured for:
   retrieving indication data of the selected watermark from a memory storing a plurality of indication data of watermarks based on the index, and
   providing to the user the indication data; and
receiving, by the server, transaction verification data from the first system.

4. A method according to claim 3 comprising:
receiving at the server digitally signed transaction verification data for authorizing the transaction.

5. A method according to claim 3 wherein the second communication path comprises a secure communication path wherein the second verification data propagates via the second communication path.

6. A method according to claim 5 wherein the first communication path comprises a secure communication path.

7. A method according to claim 3 wherein the watermark comprises image data.

8. A method according to claim 7 wherein the second verification data comprises image data for use in verifying the watermark.

9. A method according to claim 3 wherein the watermark comprises audio data.

10. A method according to claim 9 wherein the second verification data comprises audio data for use in verifying the watermark.

11. A method according to claim 3 comprising issuing to the user, by the server, authorization data comprising at least one of a digital signature, a digital certificate, a Secure Socket Layer certificate, and a certificate according to ITU-T X.509.

12. A method according to claim 3, wherein a processor of the second system is configured for:

providing to the user associated with the second system an indication of the watermark based on the second verification data; and
receiving from the user an authorization for the transaction.

13. A method according to claim 3 wherein the first verification data comprises a time signature, the time signature for use in detecting delays, the delays potentially indicative of tampering.

14. A method according to claim 3 wherein the second system comprises: at least one of a wireless device, a personal electronic device, and a peripheral memory storage device.

15. A method according to claim 3 wherein the second verification data comprises data for use by the user associated with the second system in determining a content of the watermark, the data other than a direct indication of the watermark.

16. A non-transitory computer readable medium having stored therein computer executable programming instructions which, when executed by one or more computer processors, cause the one or more processors to perform operations comprising:
establishing, by a server, a first communication path between a first system and the server via a network;
receiving, by the server, from the first system via the network data relating to a transaction for a known user;
selecting, by the server, a watermark from a memory storing a plurality of watermarks, wherein the watermarks are unrelated to any specific transaction;
including, by the server, the selected watermark in first verification data;
transmitting, by the server, to the first system the first verification data via the first communication path;
establishing, by the server, a second communication path between a second system and the server via a network, the second system associated with the known user;
transmitting, by the server, to the second system second verification data providing an indication of the watermark via the second communication path, wherein the second verification data comprises an index;
wherein a processor of the second system is configured for:
   retrieving indication data of the selected watermark from a memory storing a plurality of indication data of watermarks based on the index; and
   providing to the user the indication data; and
receiving, by the server, transaction verification data from the first system.

* * * * *

UNITED STATES PATENT AND TRADEMARK OFFICE
CERTIFICATE OF CORRECTION

| | | |
|---|---|---|
| PATENT NO. | : 8,924,309 B2 | Page 1 of 1 |
| APPLICATION NO. | : 12/186734 | |
| DATED | : December 30, 2014 | |
| INVENTOR(S) | : Laurence Hamid and Darren Krahn | |

It is certified that error appears in the above-identified patent and that said Letters Patent is hereby corrected as shown below:

In the Specification

At column 9, line 23:
"operating at 2.40 Hz"

should read:
--operating at 2.4 GHz--

Signed and Sealed this
Fifth Day of May, 2015

Michelle K. Lee
*Director of the United States Patent and Trademark Office*